(12) United States Patent
Schneider et al.

(10) Patent No.: US 12,497,990 B2
(45) Date of Patent: Dec. 16, 2025

(54) SEPARATE SCREW THREAD HELIX FIXED BY MEANS OF CLAWS

(71) Applicant: Hilti Aktiengesellschaft, Schaan (LI)

(72) Inventors: Roland Schneider, Schlins (AT); Florian Zielbauer, Rüthi (CH); Christian Gebauer, Altstätten (CH); Guenter Domani, Weissensberg (DE)

(73) Assignee: Hilti Aktiengesellschaft, Schaan (LI)

( * ) Notice: Subject to any disclaimer, the term of this patent is extended or adjusted under 35 U.S.C. 154(b) by 41 days.

(21) Appl. No.: 17/922,680

(22) PCT Filed: May 18, 2021

(86) PCT No.: PCT/EP2021/063153
§ 371 (c)(1),
(2) Date: Nov. 1, 2022

(87) PCT Pub. No.: WO2021/239517
PCT Pub. Date: Dec. 2, 2021

(65) Prior Publication Data
US 2023/0088568 A1      Mar. 23, 2023

(30) Foreign Application Priority Data
May 28, 2020   (EP) ..................... 20177116

(51) Int. Cl.
*F16B 25/00*       (2006.01)
*F16B 37/12*       (2006.01)

(52) U.S. Cl.
CPC ...... *F16B 25/0026* (2013.01); *F16B 25/0094* (2013.01); *F16B 37/12* (2013.01); *F16B 25/00* (2013.01)

(58) Field of Classification Search
CPC .. F16B 25/00; F16B 25/0026; F16B 25/0078; F16B 25/0094; F16B 37/12
(Continued)

(56) References Cited

U.S. PATENT DOCUMENTS 2,520,232 A * 8/1950 Bereza ............... F16B 25/0015
411/17
4,075,925 A   2/1978 Lerich et al.
(Continued)

FOREIGN PATENT DOCUMENTS

DE       8713708 U1    11/1987
DE    102008014806 A1  10/2008
(Continued)

OTHER PUBLICATIONS

International Search Report of PCT/EP2021/063154 dated Jul. 30, 2021.
(Continued)

*Primary Examiner* — Kristina R Fulton
*Assistant Examiner* — Jock Wong
(74) *Attorney, Agent, or Firm* — Davidson Kappel LLC

(57) ABSTRACT

A screw including a shank, at least one screw thread, which is arranged on the shank, winds around the shank and protrudes from the shank, and a separate helix element, which is arranged non-monolithically on the shank, wherein the separate helix element winds around the shank, protrudes from the shank, and constitutes at least a section of the at least one screw thread. The screw further includes at least one first claw, which projects from the shank, and which has both radial and axial overlap with the separate helix element, wherein the shank and the at least one first claw are monolithic with respect to one another.

15 Claims, 5 Drawing Sheets

(58) Field of Classification Search
USPC .................................................. 411/411, 421
See application file for complete search history.

(56) References Cited

U.S. PATENT DOCUMENTS

| | | | | |
|---|---|---|---|---|
| 5,674,035 | A * | 10/1997 | Hettich | F16B 25/0047 |
| | | | | 411/386 |
| 6,276,883 | B1 | 8/2001 | Unsworth et al. | |
| 6,494,657 | B2 | 12/2002 | Unsworth et al. | |
| 6,599,072 | B1 | 7/2003 | Gerhard et al. | |
| 6,789,991 | B2 * | 9/2004 | Hsu | F16B 25/0068 |
| | | | | 411/311 |
| 7,935,138 | B1 | 5/2011 | Richelsoph et al. | |
| 8,182,186 | B2 * | 5/2012 | Huber | F16B 25/0026 |
| | | | | 411/386 |
| 8,430,617 | B2 | 4/2013 | Hettich et al. | |
| 10,823,219 | B2 * | 11/2020 | Hakenholt | F16B 25/0094 |
| 2009/0155018 | A1 | 6/2009 | Gstach et al. | |
| 2010/0247267 | A1 | 9/2010 | Bianchi et al. | |
| 2010/0290858 | A1 | 11/2010 | Hettich et al. | |
| 2011/0142569 | A1 | 6/2011 | Hagel et al. | |
| 2012/0101534 | A1 | 4/2012 | Pitladdo et al. | |
| 2018/0283435 | A1 | 10/2018 | Hakenholt et al. | |
| 2020/0063231 | A1 | 2/2020 | Schneider et al. | |

FOREIGN PATENT DOCUMENTS

| | | |
|---|---|---|
| DE | 102007000607 A1 | 5/2009 |
| DE | 102015214257 A1 | 2/2017 |
| EP | 3620672 A1 | 3/2020 |
| EP | 3620673 A1 | 3/2020 |
| EP | 3736458 A1 | 11/2020 |
| EP | 3869051 | 8/2021 |
| EP | 3966460 A1 | 3/2022 |
| FI | 852213 L | 10/2008 |
| GB | 449916 A | 7/1936 |
| WO | WO8501544 A1 | 4/1985 |
| WO | WO 2021239518 A1 | 12/2021 |

OTHER PUBLICATIONS

International Search Report of PCT/EP2021/063153 dated Aug. 2, 2021.

Guo LiLun Chen ZhongFu Luo JingRun Chen Gang: A Method of Meticulous Fem Modeling for Threaded Bolt, Institute of systems engineering, CAEP, Miangyang 621999, China, pp. 364-367, see abstract and translation.

* cited by examiner

SEPARATE SCREW THREAD HELIX FIXED BY MEANS OF CLAWS

The invention relates to a screw. A screw of this type comprises a shank having a tip end, a rear end, which is located opposite the tip end, and a longitudinal axis, which extends through the rear end and through the tip end, at least one screw thread, which is arranged on the shank, winds around the shank and protrudes from the shank, and a separate helix element, which is arranged non-monolithically on the shank, wherein the separate helix element winds around the shank, protrudes from the shank, and constitutes at least a section of the at least one screw thread.

BACKGROUND

US20100247267 A1 discloses concrete screws, i.e. screws that can be tappingly screwed into a borehole in a concrete substrate. The screws of US20100247267 A1 are monolithic throughout.

US20180283435 A1 discloses a concrete screw that has a separate helix element which is separate from the shank. The separate helix element is located in a receiving groove, which is provided within the shank. The receiving groove has an inclined rearwardly facing wedge flank. The receiving groove also has an inclined forwardly facing flank, but in contrast to the rearwardly-facing flank, the forwardly facing flank is relatively steep.

US20100290858 A1 (EP2185829 B1) discloses screws comprising a shank-like element and a separate helix element attached thereto. According to US20100290858 A1, the separate helix element or the shank-like element, respectively, can be provided with recesses arranged at regular distances, wherein the respective other element (i.e. the shank-like element or the separate helix element, respectively), are provided with matching projections, which can engage with the recesses. Moreover, the separate helix element can be welded or bonded on the periphery of the shank.

US20200063231 A1 describes a martensitically hardenable steel and its use in concrete screws.

DE8713708 U1 describes a screw connection consisting of two elements comprising a helical thread groove each; these elements are joined by a separate helical element providing positive locking.

DE102015214257 A1 describes a shank-hub connection, in which the shank has an external toothing and a coaxially arranged hub has a corresponding internal toothing.

US20110142569 A1 discloses a concrete screw, wherein most of the screw thread is monolithic with respect to the shank, except for the region closest to the tip end, which is a separate part. The material of this separate part is chosen for tapping concrete.

EP3620673 A1 and EP3620672 A1 disclose further concrete screws with separate thread parts, which are intended to tap into concrete, wherein a rear section of the respective screw thread can again be monolithic with respect to the shank.

Another screw with a separate helix element is described in European patent application number 20158000.8, published as EP3869051. This application proposes to use stainless steels of specific hardness values for the separate helix element and for the shank.

European patent application number 19172762.7, published as EP3966460 A1, also relates to a concrete screw having a separate helix element. In this case, it is proposed to provide the separate helix element with grooves, which are intended to facilitate radial expansion.

SUMMARY OF THE INVENTION

It is an object of the invention to provide a screw that is particularly well-performing, particularly easy to manufacture, and/or particularly robust.

An inventive screw comprises at least one first claw, which projects from the shank, and which has both radial and axial overlap with the separate helix element (in particular so as to secure the separate helix element on the shank), wherein the shank and the at least one first claw are monolithic with respect to one another.

In connection with the invention, it was found that when a concrete tapping screw is provided with a separate helix element, the interface between the separate helix element and the shank has to take up significant forces. Amongst others, the interface has to transfer tensile forces directed along the longitudinal axis of the shank when the installed screw is loaded. Moreover, the interface has to also take up forces that arise during installation of the screw. These forces can have circumferentially directed components that tend to radially buckle the separate helix element or/and to unwind the separate helix element from the shank. As a consequence, a strong connection between the separate helix and the shank element is required, which can make manufacturing complex and/or expensive.

In view of this, the present invention provides the screw with at least one first claw, which overlaps the separate helix element both radially (i.e. perpendicular to the longitudinal axis) and axially (i.e. parallel to the longitudinal axis). Due to the axial overlap, there is an axial section which is occupied both by the first claw and by the separate helix element, and the separate helix element is sandwiched between the first claw and the shank in this axial section. Consequently, the first claw provides a positive locking mechanism, which radially secures the separate helix element on the shank. Moreover, this mechanism can ensure frictional contact between the separate helix element and the lateral surface of the shank, or it can, if provided, ensure meshing of corresponding toothings on the separate helix element and the shank, respectively, wherein both of these systems allow the transfer of circumferentially directed forces between the shank and the separate helix element. In addition, the radial overlap between the first claw and the separate helix element can provide a positive locking mechanism that can secure the separate helix element also axially on the shank. Accordingly, axially, radially and/or circumferentially directed forces can be transferred between the shank and the separate helix element particularly effectively, which can provide particularly good screw performance.

Furthermore, the shank and the at least one first claw are monolithic with respect to one another. Accordingly, they consist of one piece, are solid and unbroken, are manufactured from the same piece of material and/or arranged without joints or seams. This can not only provide a particularly reliable connection between the first claw and the shank, it can also allow particularly easy and efficient manufacturing.

Thus, a particularly well-performing screw can be manufactured at particularly low effort and cost. In particular, mechanical clamping can provide particularly high joining quality and robustness, which can permit to use the screw also in case of tough installation conditions, without significant probability of screw thread detachment.

The first claw can project radially over the shank, or can be flush with the shank. The shank is an elongate member and can, in particular, be generally cylindrical, more preferably circular cylindrical, possibly including a groove that accommodates the separate helix element. The tip end and the rear end, respectively, constitute opposite ends of the shank. The shank comprises a longitudinal axis, which extends through the rear end and through the tip end of the shank. The tip end is that end of the shank that is intended to be inserted first into a borehole when the screw is installed. The shank might be pointed at the tip end, but is preferably blunt at the tip end, in particular if the screw is a concrete screw. The screw would also comprise a drive for imparting torque on the shank. The drive could be located at the rear end of the shank, for example if the drive is a head, but it could also be located within the shank, for example if the screw is a headless screw.

The first claw, and if present, also the second claw, can be continuous or discontinuous alongside the separate helix element (so that circumferential joining is interrupted at local spots).

The at least one screw thread is usually generally helical, but could deviate from a strict mathematical helix, e.g. in order to provide additional functionality. The at least one screw thread winds around the shank and the longitudinal axis of the shank, i.e. it turns helically around the shank, in particular by one or more turns, more preferably by at least two or three turns. The screw thread is an external thread. It radially protrudes from the shank and can engage a mating internal thread.

The at least one screw thread is preferably continuous, but could also have discontinuities. For example, it could have a sawtooth structure at least in some regions.

For a particular easy design, the screw can comprise only a single screw thread. However, additional screw threads might also be provided, e.g. for additional functionality. These additional screw threads might be axially overlapping or non-overlapping with respect to the at least one screw thread and might be designed differently from the at least one screw thread or in analogy thereto.

The separate helix element and the shank are non-monolithic with respect of one another. Accordingly, they are separate pieces, and/or at least one joint or seam is provided between them. In particular, the separate helix element and the shank, respectively, can be manufactured from different pieces of material and/or separately from one another, and joined afterwards. In particular, the separate helix element is non-monolithically connected to the shank, in particular so as to transfer tensile pull-out forces directed along the longitudinal axis of the shank from the shank into the separate helix element, so that pull-out load can be transferred from the shank via the separate helix element into the surrounding substrate. Pull-out forces, in this connection, are rearwardly directed axial forces.

The separate helix element extends along the longitudinal axis of the shank. The separate helix element is usually generally helical, but could deviate from a strict mathematical helix, e.g. in order to provide additional functionality. The separate helix element winds around the shank and the longitudinal axis of the shank, i.e. it turns helically around the shank, in particular by one or more turns. In particular, the separate helix element can have a crest, which radially protrudes from the shank and which constitutes the screw thread, as well as a root, which is embedded in the shank, preferably in the groove that is, advantageously, provided in the shank.

The separate helix element constitutes at least a section, in particular at least a helical section, of the at least one screw thread. Thus, the screw thread could also have additional helical sections, which are not formed by the separate helix element, and which could be located in front of the separate helix element (i.e. tipwardly) and/or rearwardly thereof. However, the separate helix element could also constitute the entirety of the at least one screw thread, which can be preferred.

Where used in this document, the directions "axial", "longitudinal", "radial" and "circumferential" can refer, in particular, to the longitudinal axis of the shank, which might coincide with the longitudinal axis of the entire screw.

It is particularly preferred that the first claw extends along at least $1/36$ of a turn of the separate helix element. Accordingly, the first claw spans an angle of at least 10° around the longitudinal axis of the shank. More preferably, the first claw extends along at least $1/16$ of a turn of the separate helix element. It can also extend along one or more turns of the separate helix element, preferably along all of the separate helix element. Accordingly, the first claw has a relatively long helical extension, providing a particular efficient securement of the separate helix element on the shank. In particular, a "fail-safe" design can be provided, which is still effective even when separate helix element should fracture. For the same reason, it is preferred that the first claw extends along at least 20% or at least 50% of the total axial length of the separate helix element, more preferably along the entire separate helix element. Preferably, the first claw is located at least close to a tipward end of the separate helix element. As already mentioned above, the first claw can have discontinuities.

According to another preferred embodiment of the invention, the screw further comprises at least one second claw, which projects from the shank, and which has both radial and axial overlap with the separate helix element (in particular so as to secure the separate helix element on the shank), wherein the shank and the at least one second claw are monolithic with respect to one another, and wherein the at least one first claw and the at least one second claw, respectively, point into opposite axial directions. For example, the first claw might point towards the tip end of the shank and the second claw towards the rear end of the shank, or vice versa. Accordingly, opposite flanks of the separate helix element can be clamped, which can provide particularly good securing of the separate helix element on the shank.

The at least one second claw overlaps the separate helix element both radially (i.e. in a direction perpendicular to the longitudinal axis) and axially (i.e. in the direction of the longitudinal axis). Due to the axial overlap, there is an axial section which is occupied both by the second claw and by the separate helix element, and the separate helix element is sandwiched between the second claw and the shank in this axial section. Consequently, the second claw provides a positive locking mechanism, which radially secures the separate helix element on the shank. Moreover, this mechanism can further improve frictional contact between the separate helix element and the lateral surface of the shank, or it can, if provided, further improve meshing of corresponding toothings on the separate helix element and the shank, respectively. In addition, the radial overlap between the second claw and the separate helix element can provide a positive locking mechanism that can secure the separate helix element also axially on the shank. Accordingly, axially, radially and/or circumferentially directed forces can be transferred between the shank and the separate helix element even more effectively, which can provide even better screw performance.

The shank and the at least one second claw are monolithic with respect to one another Accordingly, they consist of one piece, are solid and unbroken, are manufactured from the same piece of material and/or arranged without joints or seams. This can not only provide a particularly reliable connection between the second claw and the shank, it can also allow particularly easy and efficient manufacturing.

If one of the claws, for example the first claw, points towards the tip end, it can secure the separate helix element against rearward axial displacement. If one of the claws, for example the second claw, points towards the rear end, it can secure the separate helix element against forward, i.e. tipward axial displacement.

The second claw can project radially over the shank, or can be flush with the shank.

It is particularly preferred that the second claw extends along at least 1/36 of a turn of the separate helix element. Accordingly, the second claw spans an angle of at least 10° around the longitudinal axis of the shank. More preferably, the second claw extends along at least 1/16 of a turn of the separate helix element. It can also extend along one or more turns of the separate helix element, preferably along all of the separate helix element. Accordingly, the second claw has a relatively long helical extension, providing a particular efficient securement of the separate helix element on the shank. In particular, a "fail-safe" design can be provided, which is still effective even when separate helix element should fracture. For the same reason, it is preferred that the second claw extends along at least 20% or at least 50% of the total axial length of the separate helix element, more preferably along the entire separate helix element. Preferably, the second claw is located at least close to a tipward end of the separate helix element. As already mentioned above, the second claw can have discontinuities.

In particular, the separate helix element can be sandwiched, in the axial direction, between the first claw and the second claw, wherein the axial sandwich structure consists of the first claw, the second claw and a section of the separate helix element that is adjacent to both the first claw and the second claw.

Advantageously, the at least one first claw and the at least one second claw delimit an undercut groove, in which the separate helix element is arranged. Accordingly, the first claw and the second claw have circumferential overlap so as to provide a receptacle, namely the undercut groove, for the separate helix element. This can provide particularly good securing of the separate helix element, since a conjointly secured helical section of the separate helix element can be provided, which is secured both by the first claw and by the second claw. In particular, the root of the separate helix element is arranged in the undercut groove. The bottom of the groove can be formed by the shank. The groove could usually be generally helical, but could deviate from a strict mathematical helix, e.g. in order to provide additional functionality.

The groove could for example be a T-groove, or it could have a circular cross-section. Preferably, however, the groove is a dovetail groove, which can provide particularly good engagement at low effort.

It is particularly preferred that the groove projects radially into the shank. Accordingly, it projects radially into the generally (circular) cylindrical outline of the shank. This can provide particularly good engagement of the root of the separate helix element, since the claws are axially supported by the shank.

According to another preferred embodiment of the invention, at least one toothing is provided on the shank, which is engaged by the separate helix element, in particular so as to transfer circumferentially (with respect to the longitudinal axis of the shank) directed forces between the shank and the separate helix element. This can further improve robustness of the screw, and can, in particular, improve installation performance, since installation gives rise to circumferentially directed forces. The at least one toothing extends circumferentially (with respect to the longitudinal axis of the shank), and can be located within the shank (for example at the bottom of the groove) and/or within one or both of the first claw and the second claw (which are monolithic with the shank). The separate helix element has at least one counter-toothing, which meshes with the at least one toothing provided on the shank. The at least one toothing can have radially or/and axially projecting teeth (both with respect to the longitudinal axis of the shank). In particular, the at least one toothing can project into the groove. The toothing may extend generally all along the separate helix element, but might also be shorter. For example, it may extend merely along the first 1-3 turns of the separate helix element which are located closest to the tip end of the shank.

It is particularly preferred that the shank consists of a first material and the separate helix element consists of a second material, wherein the first material and the second material are different materials. Employing different materials for the different elements allows to resolve conflicting objectives regarding the materials in a particular easy manner.

The first material (i.e. that of the shank) could for example be a metal material (for example steel, aluminium, titanium) or a plastic material. The second material (i.e. that of the separate helix element) can for example be a metal material (steel, aluminium, titanium, hard metals), a plastics material or a ceramic material.

In particular, the present invention can be used for screws intended for indoor applications. In this case, both the first material and the second material could be preferably carbon steels, however preferably of different type.

The present invention could also be used for screws intended for outdoor applications. In this case, the following configurations can be, in particular, envisaged:

Both the first material and the second material are stainless steels, however preferably of different type.

The first material (i.e. that of the shank) is a carbon steel provided with a corrosion protection coating applied on the shank, and the second material (i.e. that of the separate helix element) is a stainless steel.

The first material (i.e. that of the shank) is a stainless steel, and the second material (i.e. that of the separate helix element) is a carbon steel provided with a corrosion protection coating applied on the separate helix element.

In case of outdoor applications, providing the screw thread with corrosion protection, either intrinsically or by means of a coating, can allow to use the full length of the embedded screw thread for load transfer.

Preferably, both the first material and the second material are metal materials, in particular steel materials.

The first material (i.e. that of the shank) can for example be an austenitic (e.g. 1.4404, 1.4301, 1.4529, or similar), a duplex (e.g. 1.4062, 1.4162, 1.4362, 1.4410, 1.4509, or similar), a ferritic (e.g. 1.4105, 1.4113, 1.4521, or similar) or a PH stainless steel (e.g. 15-5 PH or similar).

The second material (i.e. that of the separate helix element) can for example be an austenitic (e.g. 1.4565/1.4566, 1.3808, or similar), a martensitic (e.g. 1.4108, 1.4109, 1.4116, 1.4122, the steel grade described in US2020063231 A1) or a PH stainless steel (e.g. 17-7 PH).

It is particular advantageous that the second material (i.e. that of the separate helix element) is a steel material, preferably a stainless-steel material, having a Vickers hardness between 550 HV10 and 800 HV10, preferably between 650 HV10 and 750 HV10, wherein Vickers hardness is in particular according to ISO 6507. Accordingly, the second steel material, which is used for the screw thread helix, has a relatively high hardness, which corresponds to a relatively high steel resistance, what can be advantageous in order to efficiently transfer loads between the external screw thread and the internal substrate thread, especially in localized or point-to-point contact situations. Moreover, a high strength level of the separate helix element can provide a particularly high design freedom, for example regarding the cross-section geometry of the separate helix element. For example, the thread cross section of the separate helix element can be made relatively narrow (thread flank angles of 30°-45° instead of 40-50° can be envisaged), which still provides high structural resistance, but with improved installation performance due to reduced tapping action.

According to a further preferred embodiment of the invention, the first material (i.e. the shank's material) is a steel material, preferably a stainless-steel material, having a Vickers hardness between 250 HV10 and 800 HV10, wherein Vickers hardness is in particular according to ISO 6507. This range of hardness of the shank can provide adequate robustness.

As already mentioned above, the screw is preferably a concrete screw, i.e. the screw, in particular the screw thread thereof, is able to, at least partly, tap its mating internal screw thread groove in a concrete substrate. In particular, a ratio of the maximum outer thread diameter of the screw thread to the pitch of the screw thread can be between 1 and 2, in particular between 1.2 and 1.6, at least in some regions of the screw thread, more preferably at least in some regions of the screw thread located near the tip end, most preferably throughout the screw thread. These are typical dimensions for concrete screws.

BRIEF DESCRIPTION OF THE DRAWINGS

The invention is explained in greater detail below with reference to preferred exemplary embodiments, which are depicted schematically in the accompanying drawings. Individual features of the exemplary embodiments presented below can be implemented either individually or in any combination within the scope of the present invention.

FIG. 20 is an isometric view with the separate helix element left out. FIG. 21 is a view analogous to that of FIG. 3. FIG. 22 is a cross-sectional view B-B according to FIG. 21, in which the cross-sectional plane is a transverse plane that is perpendicular to the longitudinal axis of the shank.

DETAILED DESCRIPTION

Figure 1:
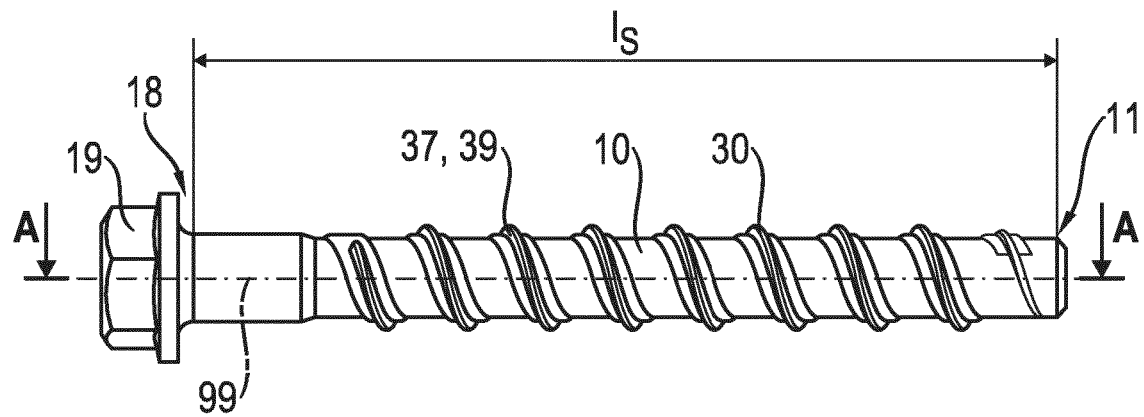
FIG. 1 is a side view of a screw.
Figure 2:
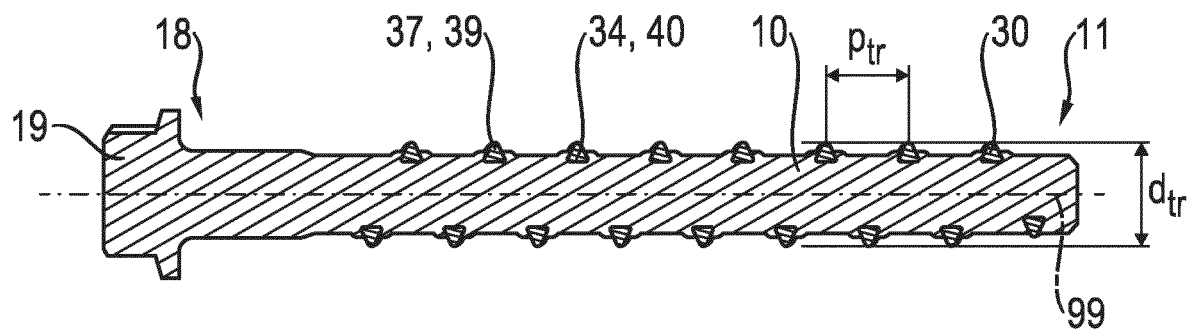
FIG. 2 is a cross-sectional view A-A of the screw of FIG. 1, in which the cross-sectional plane is a longitudinal plane that includes the longitudinal axis of the screw.
Figure 3:
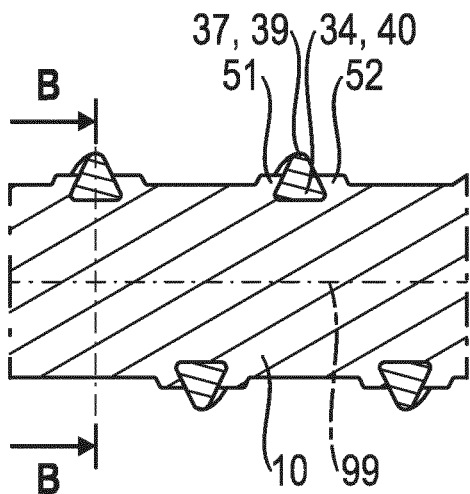
FIGS. 3 and 4 show a detail of a middle region of the screw of FIG. 1, in FIG. 3 in a cross-sectional view A-A according to FIG. 1, in which the cross-sectional plane is a longitudinal plane that includes the longitudinal axis of the shank, and in FIG. 4 in a cross-sectional view B-B according to FIG. 3, in which the cross-sectional plane is a transverse plane that is perpendicular to the longitudinal axis of the shank.
Figure 4:
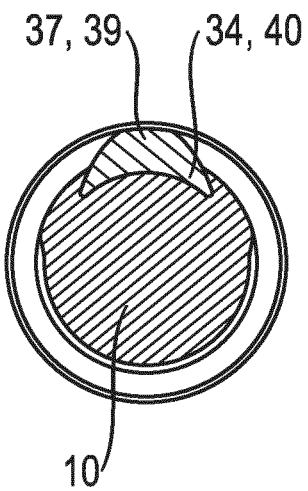

FIGS. 1 to 5 illustrate an embodiment of an inventive screw. The screw comprises an elongate shank 10, which has a tip end 11. The tip end 11 is the leading end of the shank 10 and the shank 10 is intended to be inserted with the tip end 11 first into a borehole when the screw is installed. The shank 10 also has rear end 18, which is located on the shank 10 opposite the tip end 11. The screw furthermore has a screw drive 19 that is connected to the shank 10, monolithically in the present case by way of example, for applying torque to the shank 10. In the shown embodiment, the screw drive 19 is a hex head located at the rear end 18, but this is an example only. Any other type of screw drive 19 can be used, such as an external type, for example hex, line (ALH), square, or a socket head, for example Bristol, clutch, double hex, hex socket, hexalobular socket, line (ALR), polydrive, Robertson, spline, TP3, and others. The screw drive 19 could also be located within the shank 10 and/or remote from the rear end 18, in particular if the screw is headless and/or internally threaded.

The elongate shank 10 comprises a longitudinal axis 99, extending in the longitudinal direction of the shank 10 and through both the tip end 11 and through the rear end 18.

The screw furthermore comprises a separate helix element 37, which is located on the shank 10, and which winds around the shank 10 and/or the longitudinal axis 99. In particular, the separate helix element 37 is arranged coaxially with respect to the shank 10. The separate helix element 37 comprises a crest 39 and a root 34. In particular, the crest 39 is helical and radially adjoins the root 34, which is also helical. The root 34 is located on the radial inside of the separate helix element 37, i.e. it is located closer to the longitudinal axis 99 of the shank 10 than is the adjacent crest 39.

The separate helix element 37, in particular the crest 39 thereof, constitutes at least a helical section of a screw thread 30 of the screw. In shown embodiment, the separate helix element 37, in particular the crest 39 thereof, constitutes all of the screw thread 30 of the screw, but this is an example only, and the screw thread 30 might have additional helical sections. The screw thread 30 is located on the shank 10, winds around the shank 10 and/or the longitudinal axis 99, and projects radially, with respect to the longitudinal axis 99, from the shank 10. The screw thread 30 is an external screw thread.

The separate helix element 37 and the shank 10 are non-monolithic with respect to one another. Due to the latter, the screw thread 30 and the shank 10 are also non-monolithic with respect to one another, at least regionally.

The shank 10 consists of a first material. The separate helix element 37 consists of a second material. In the present embodiment, the first material and the second material are different materials. The second material can in particular be a metal material, preferably a steel material, most preferably a stainless steel. The first material can in particular be a metal material, preferably a steel material, most preferably a stainless steel. The shank 10 and/or the separate helix element 37 could also be provided with a respective coating, comprising one or more layers.

In the present embodiment, the separate helix element 37 and/or the screw thread 30 has a plurality of turns, namely approximately 8.5 turns. Preferably, at least two turns are provided. By way of example, the separate helix element 37 and/or the screw thread 30 spans, axially (i.e. in the direction parallel to the longitudinal axis 99), approximately 80% of the length $l_s$ of the shank 10. The screw thread 30 thus forms a main thread of the screw. The screw thread 30 can also span up to 100% of the length $l_s$ of the shank 10; preferably, it spans at least 20% of the length $l_s$ of the shank 10.

Whereas in the shown embodiment, no additional screw threads are shown, the screw might also have additional screw threads, formed monolithically or non-monolithically with respect to the shank 10.

The shank 10 is provided with a helical groove 40, which winds around the longitudinal axis 99 of the shank 10, and which projects, on the lateral surface of the shank 10, radially into the shank 10. The separate helix element 37, in particular the root 34 thereof, is arranged within the groove 40, whereas its crest 39 projects from the shank 10. The screw is provided with a first claw 51 and with a second claw 52, wherein both the first claw 51 and the second claw 52 secure the separate helix element 37 on the shank 10, in particular they secure the separate helix element 37, in particular its root 34, within the groove 40.

Both the first claw 51 and the second claw 52 project from the shank 10 and are monolithic with respect to the shank 10. Both the first claw 51 and the second claw 52 have both axial (with respect to the longitudinal axis 99) overlap and radial (with respect to the longitudinal axis 99) overlap with the adjacent separate helix element 37, in particular with the root 34 thereof. Both the first claw 51 and the second claw 52 clamp the separate helix element 37, in particular the root 34 thereof, against the shank 10. In particular, they clamp the separate helix element 37, in particular the root 34 thereof, in the radial and axial directions (with respect to the longitudinal axis 99). In the present embodiment, this clamping is tight. Accordingly, the first claw 51 and the second claw 52 clamp the separate helix element 37, in particular the root 34 thereof, tightly radially against the shank 10 as well as tightly in the axial direction. However, some play might be provided, for example due to manufacturing reasons or/and to provide additional functionality. Clamping of the separate helix element 37, in particular of its root 34, in the axial direction takes place in-between the first claw 51 and the second claw 52.

The first claw 51 projects forwardly, i.e. tipwardly, i.e. towards the tip end 11, whereas the second claw 52 projects rearwardly, i.e. towards the rear end 18, in particular headwardly. The first claw 51 clamps a rearwardly facing flank of the separate helix element 37, whereas the second claw 52 clamps a forwardly facing, i.e. tipwardly facing, flank of the separate helix element 37.

In the present embodiment, the first claw 51 and the second claw 52 extend all along the separate helix element 37, i.e. both the first claw 51 and the second claw 52 have the same number of turns as the separate helix element 37 has, wherein the first claw 51 and the second claw 52 subduct near the tip end 11. But this is an example only.

Both the first claw 51 and the second claw 52 face, and preferably adjoin, the separate helix element 37. Both the first claw 51 and the second claw 52 adjoin the groove 40, and the first claw 51 delimits the groove 40 rearwardly, and the second claw 52 delimits the groove forwardly (i.e. tipwardly), i.e. the first claw 51 forms a forwardly facing (i.e. tipwardly facing) flank of the groove 40, and the second claw 52 forms a rearwardly facing flank of the groove 40. The first claw 51 and the second claw 52 form an undercut structure at the groove 40, and the groove is thus an undercut groove 40. In the present embodiment, the undercut structure of the groove 40 extends all along the separate helix element 37, but this is an example only. The first claw 51, the second claw 52 and the undercut groove 40 are shown to be continuous, but could also be provided with discontinuities, e.g. voids. The undercut structure of the groove 40 secures the separate helix element 37, in particular the root 34 thereof, on the shank 10. The bottom of the groove 40 is formed by the shank 10, in particular by the lateral surface thereof. In the shown embodiment, the undercut groove 40 is a dovetail groove 40.

In particular, the flank angle of the groove 40 can be generally the same as thread flank angle of the root 34 of the separate helix element 37, for particularly efficient clamping.

The screw is a concrete screw, i.e. the screw thread 30 is able to tap, in particular cut, a corresponding mating thread in a concrete substrate. The screw thread 30 has an outer thread diameter $d_{tr}$. At least near the tip end 11 of the non-installed screw, a ratio of the maximum outer thread diameter $d_{tr}$ of the screw thread 30 to the pitch $p_{tr}$ of the screw thread 30 is between 1 and 2, in particular between 1.2 and 1.6. In particular, the crest 39 of the separate helix element 37 is able to cut into a substrate and/or to form a positive interlock with the substrate.

The screw thread 30 might be strictly mathematically helical, but might also deviate from a helical form, which can e.g. provide additional functionality.

Preferably, the first claw 51 and the second claw 52 form the primary connection between the separate helix element 37 and the shank 10. An additional material connection (for example gluing, or material connections based on heat input, such as brazing or welding) could also be provided, but are preferably absent.

In the embodiment of FIGS. 1 to 5, the first claw 51 and the second claw 52 radially project over the adjacent lateral surface of the shank 10, i.e. they each form a raised shoulder that radially projects from the shank 10. However, the first claw 51 and the second claw 52 could also be flush with the adjacent lateral surface of the shank 10, as shown in FIGS. 6 and 7. The modification of FIGS. 6 and 7 might be combined with all the other presented embodiments.

Figure 5:
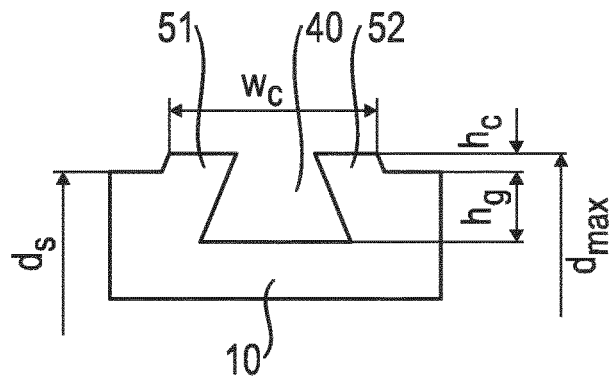
FIG. 5 shows, again, a detail of a middle region of the screw of FIG. 1, in cross-sectional view A-A according to FIG. 1, in which the cross-sectional plane is a longitudinal plane that includes the longitudinal axis of the shank, with the separate helix element omitted, and including size indications.
Figure 6:
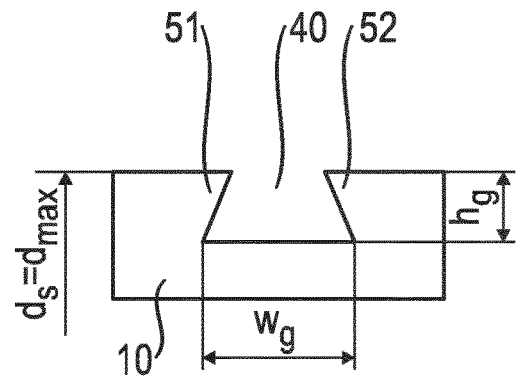
FIGS. 6 and 7 show, in a view analogous to that of FIG. 5, a modification of the embodiment of FIGS. 1 to 5, wherein the separate helix element is omitted in FIG. 6.
Figure 7:
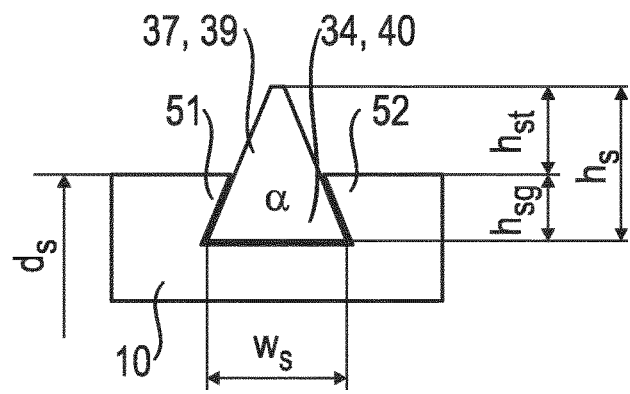

In all presented embodiments, the geometry of the groove 40 and/or of the separate helix element 37 can be, preferably, chosen in following ranges (wherein $d_b$ is the nominal drill hole diameter and $p_{tr}$ is the pitch of the screw thread 30, and the remaining parameters specified in the figures, in particular FIGS. 5 to 7):

$d_s/d_b$=0.7-0.99 (ratio shank diameter to nominal drill hole diameter).

2 $h_g/d_s$=0.1-0.4 (ratio 2× groove depth to shank diameter). $d_{max}/d_b$=0.9-1.2 (ratio maximum diameter of lateral clamping to nominal drill hole diameter). Note that if $d_{max}/d_b$>1.0 an additional threadlike interaction with the surrounding substrate is provided, in which the first claw 51 or/and the second claw 52 act against the surrounding substrate and preferably cut the surrounding substrate, which substrate is preferably concrete, as already mentioned.

$w_c/p_{tr}$=0.2-0.7 (ratio width of the clamping to thread pitch).

Depth of groove 40 ($h_g$) can be constant along all of the groove 40. Alternatively, the groove 40 can subduct, in particular in its starting section located close to the tip end 11. This subduction of the groove 40 can be accompanied by a subduction of the screw thread 30 in its starting section located close to the tip end 11, i.e. by a taper of the outer thread diameter $d_{tr}$ towards the tip end 11. Accordingly, the starting section of the screw thread 30 would cut gradually in the surrounding substrate.

$h_{sg}/h_s$=0.2-1.0 (ratio of radial embedment depth of the separate helix element 37 to total height of the separate helix element 37). Note that $h_{sg}/h_s$=1.0 means that the separate helix element 37 is completely sunk into the shank 10, which can be the case near the tip end 11. $h_{sg}/h_s$=0.2 means that 20% of the overall profile height of the height of the separate helix element 37 is located within the shank 10 and available for mechanical joining between the separate helix element 37 and the shank 10.

Figure 8:
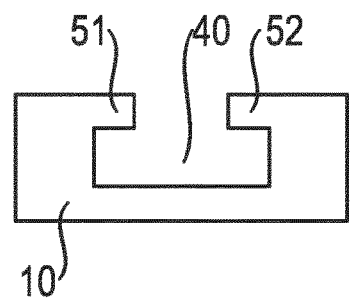
FIG. 8 shows, in a view analogous to that of FIG. 5, another modification of the embodiment of FIGS. 1 to 5.
Figure 9:
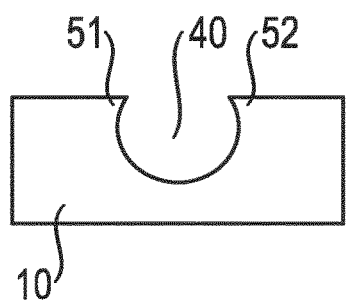
FIG. 9 shows, in a view analogous to that of FIG. 5, another modification of the embodiment of FIGS. 1 to 5.

In the embodiment of FIGS. 1 to 5, and in the modification shown in FIGS. 6 and 7, the groove 40 is a dovetail groove 40. However, other groove cross-sections might be provided, such as a T-groove 40 (see FIG. 8) or a groove 40 having circular cross-section (see FIG. 9). The modifications of FIGS. 8 and 9, respectively, might be combined with all the other presented embodiments.

Preferably, the cross-section of the groove 40 corresponds to the cross-section of the root 34 of the separate helix element 37. In particular, both cross-sections are generally identical.

Figure 10:
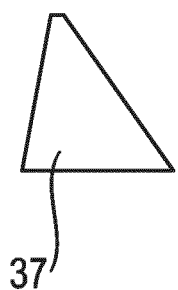
FIGS. 10 to 12 show possible modifications of the cross-section of the separate helix element.
Figure 11:
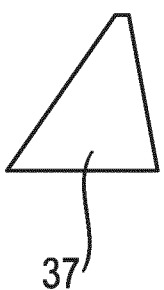
Figure 12:
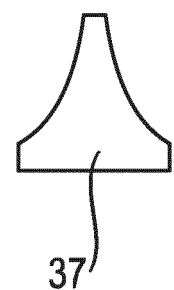

In the embodiment of FIGS. 1 to 5, and in the modification shown in FIGS. 6 and 7, the separate helix element 37 has generally triangular cross-section, namely that of an isosceles triangle, wherein the two sides of equal length are provided by the forwardly facing flank and the rearwardly facing flank of the separate helix element 37, respectively. However, other cross-sections might be provided for the separate helix element 37, such as a rearwardly tilting scalene triangle (see FIG. 10), a forwardly tilting scalene triangle (see FIG. 11), or a triangle with concavities in its flanks (see FIG. 12). The modifications of FIG. 10, FIG. 11 or FIG. 12, respectively, might be combined with all the other presented embodiments.

Figure 13:
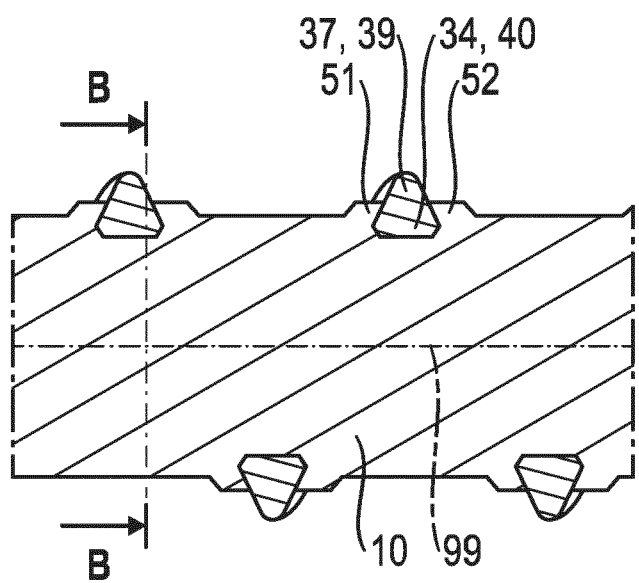
FIGS. 13 and 14 show, in views analogous to those of FIGS. 3 and 4, respectively, another modification of the embodiment of FIGS. 1 to 5, FIGS. 15 to 19 show another modification of the embodiment of FIGS. 1 to 5.
Figure 14:
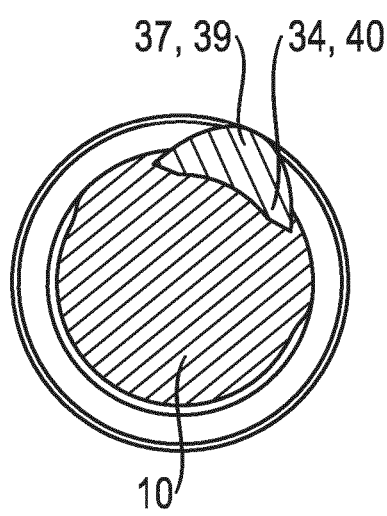
Figure 15:
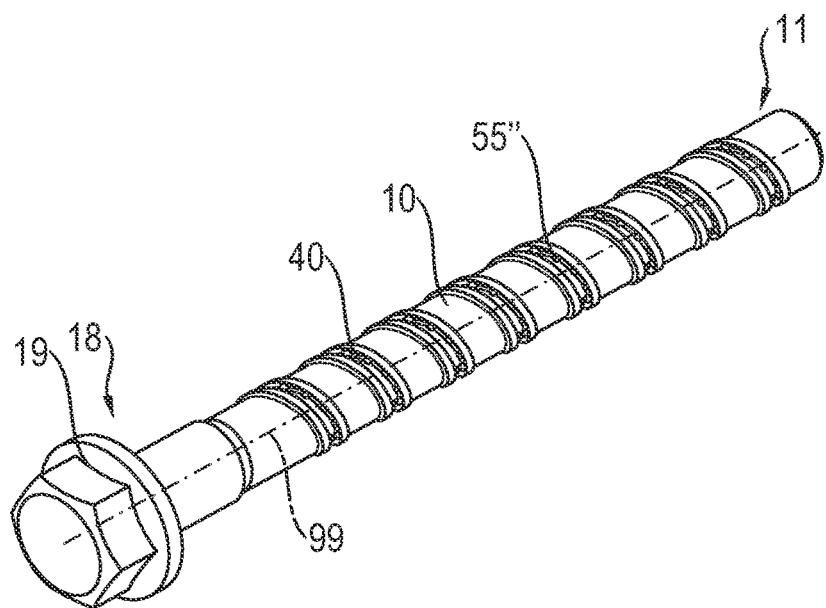
FIG. 15 is an isometric view with the separate helix element left out.
Figure 16:
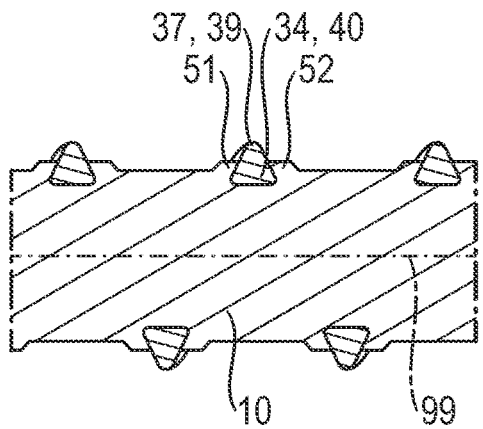
FIG. 16 is a view analogous to that of FIG. 3.
Figure 17:
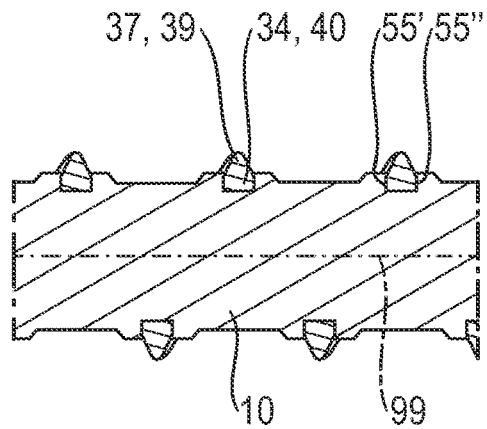
FIG. 17 is another cross-sectional view, in which the cross-sectional plane is a longitudinal plane that includes the longitudinal axis of the shank, wherein this plane is slightly angularly offset to that of FIG. 16.
Figure 18:
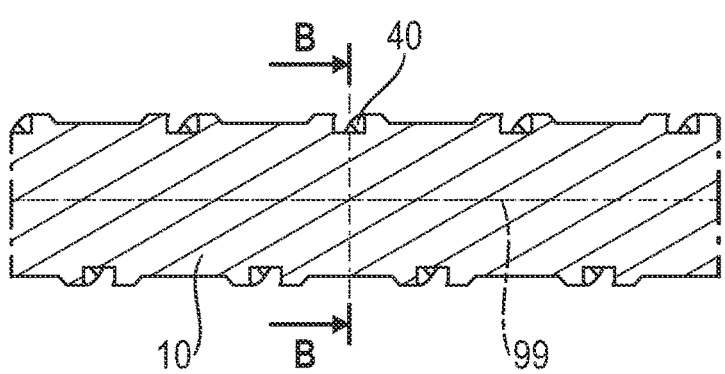
FIG. 18 is a view analogous to that of FIG. 17, but with the separate helix element left out.
Figure 19:
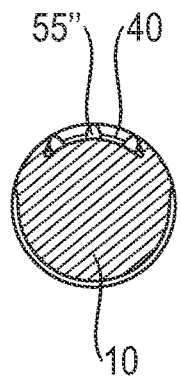
FIG. 19 is a cross-sectional view B-B according to FIG. 18, in which the cross-sectional plane is a transverse plane that is perpendicular to the longitudinal axis of the shank, again with the separate helix element left out.

In the embodiment of FIGS. 1 to 5, axial loads and radial loads between the separate helix element 37 and the shank 10 can be transferred via positive connection, i.e. via interlocking elements (in particular via interlock of the separate helix element 37 as a first element and the first claw 51 and the second claw 52 as a second element). Circumferentially directed loads, on the other hand, for example torsional loads that arise during screw installation, can be transferred via friction between the separate helix element 37 as a first friction element and the first claw 51, the second claw 52 and/or the shank 10 as second friction elements. In order to further increase friction, it is possible to modify the cross-sections of the root 34 of the separate helix element 37 and of the corresponding groove 40. A possible modification is shown in FIGS. 13 and 14, where the root 34 has a hexagonal cross-section, in which the bottom of the root tapers towards the longitudinal axis 99, when seen in cross-section. Due to this taper, friction is increased when the separate helix element 37 is radially pushed towards the longitudinal axis 99, in analogy to a tapered interference fit/V-belt mechanism. The modifications of FIGS. 13 and 14 might be combined with all the other presented embodiments.

To further tighten transfer of circumferentially directed loads between the separate helix element 37 and the shank 10, for example torsional loads that arise during screw installation, it is possible to provide the screw with toothings 55 or 56, which are associated with the shank 10, and to have the separate helix element 37, in particular the root 34 thereof, engage these toothings.

In the embodiment of FIGS. 15 to 19, two toothings 55' and 55" are provided, which both have axially (with respect to the longitudinal axis 99 of the shank 10) projecting teeth. Toothing 55' is provided in the first claw 51 and comprises forwardly, i.e. tipwardly projecting teeth, and toothing 55" is provided in the second claw 52 and comprises rearwardly projecting teeth. Both toothings 55' and 55" mesh with the separate helix element 37, in particular with the root 34 thereof, thereby providing a two-sided lateral positive connection between the separate helix element 37 and the shank 10. Both toothings 55' and 55" project into the groove 40. In the shown embodiment, the toothings 55' and 55" extend generally all along the separate helix element 37, but they might also be shorter. For example, they may extend merely along the first 1-3 turns of the separate helix element 37 located closest to the tip end 11.

Figure 20:
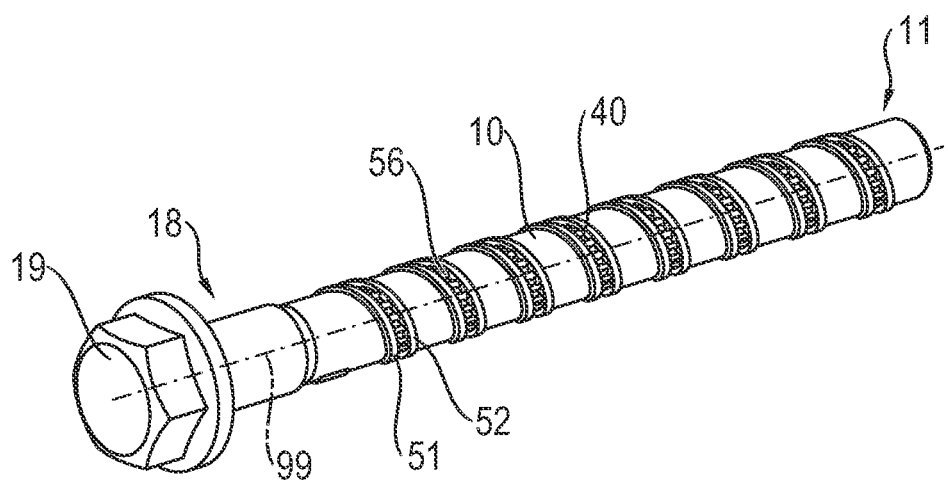
FIGS. 20 to 22 show another modification of the embodiment of FIGS. 1 to 5.
Figure 21:
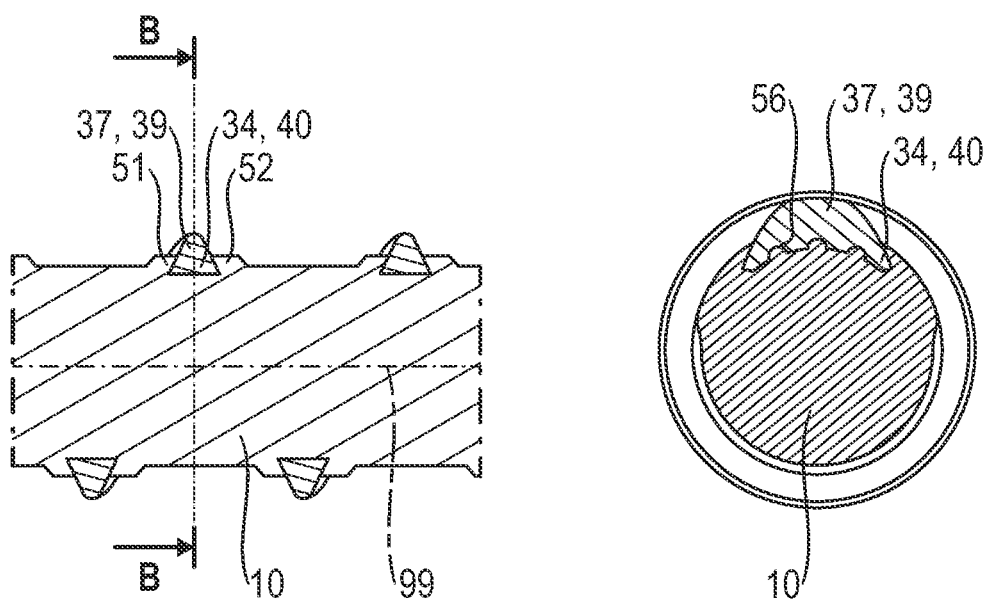
Figure 22:
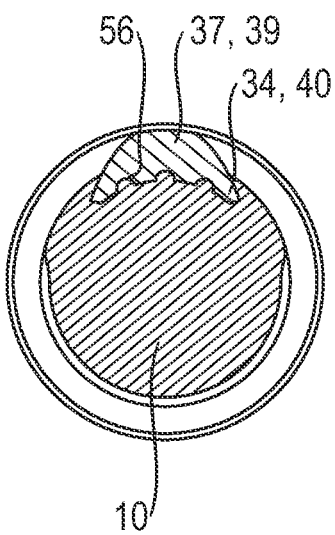

In the embodiment of FIGS. 20 to 22, a toothing 56 having radially outwardly (with respect to the longitudinal axis 99 of the shank 10) projecting teeth is provided on the shank 10, namely at the bottom of the groove 40. This toothing 56 projects into the groove 40 and meshes with the separate helix element 37, in particular with the root 34 thereof, thereby providing a radial positive connection between the separate helix element 37 and the shank 10. In the shown embodiment, the toothing 56 extends generally all along the separate helix element 37, but it might also be shorter. For example, it may extend merely along the first 1-3 turns of the separate helix element 37 which are located closest to the tip end 11.

The modifications of FIGS. 15 to 19 and 20 to 22, respectively, might be combined with all the other presented embodiments or they might be combined with each other.

What is claimed is:

1. A screw comprising:
a shank having a tip end, a rear end located opposite the tip end, and a longitudinal axis extending through the rear end and through the tip end;
at least one screw thread arranged on the shank to wind around the shank and protrude from the shank;
a separate helix element arranged non-monolithically on the shank, the separate helix element winding around the shank, protruding from the shank, and constituting at least a section of the at least one screw thread; and
at least one first claw projecting from the shank and having both radial and axial overlap with the separate helix element, the shank and the at least one first claw being monolithic with respect to one another;
the shank including a helical groove winding around the longitudinal axis, the groove projecting radially into the shank, the separate helix element being arranged in the groove, the groove having a groove subduction in a groove starting section closer to the tip end than the rear end, the groove subduction being accompanied by a thread subduction of the screw thread in a thread starting section closer to the tip end than the rear end.

2. The screw as recited in claim 1 wherein the first claw extends along at least 1/36 of a turn of the separate helix element.

3. The screw as recited in claim 1 further comprising at least one second claw projecting from the shank having both radial and axial overlap with the separate helix element, the shank and the at least one second claw being monolithic with respect to one another, and the at least one first claw and the at least one second claw, respectively, pointing in opposite axial directions.

4. The screw as recited in claim 3 wherein the second claw extends along at least 1/36 of a turn of the separate helix element.

5. The screw as recited in claim 3 wherein the at least one first claw and the at least one second claw delimit an undercut groove, the separate helix element being arranged in the undercut groove.

6. The screw as recited in claim 5 wherein the groove is a dovetail groove.

7. The screw as recited in claim 1 further comprising at least one toothing on the shank and engaged by the separate helix element.

8. The screw as recited in claim 1 wherein the shank consists of a first material and the separate helix element consists of a second material, wherein the first material and the second material are different materials.

9. The screw as recited in claim 8 wherein both the first material and the second material are metal materials.

10. The screw as recited in claim 9 wherein the metal materials are steel materials.

11. The screw as recited in claim 8 wherein the second material is a steel material having a Vickers hardness between 550 HV10 and 800 HV10 and the first material is a steel material having a Vickers hardness between 250 HV10 and 800 HV10.

12. The screw as recited in claim 11 wherein the second material is a steel material having a Vickers hardness between 650 HV10 and 750 HV10.

13. The screw as recited in claim 1 wherein the screw is a concrete screw.

14. The screw as recited in claim 1 wherein a ratio of the maximum outer thread diameter of the screw thread to the pitch of the screw thread is between 1 and 2 at least in some regions of the screw thread.

15. The screw as recited in claim 1 wherein a ratio of the maximum outer thread diameter of the screw thread to the pitch of the screw thread is between 1.2 and 1.6 at least in some regions of the screw thread.

* * * * *